United States Patent Office 2,917,419
Patented Dec. 15, 1959

2,917,419

METHOD OF FORMING AN ADHERENT OXIDE FILM ON TANTALUM AND NIOBIUM FOIL

Preston Robinson, Williamstown, Mass., assignor to Sprague Electric Company, North Adams, Mass., a corporation of Massachusetts No Drawing. Application March 6, 1958
Serial No. 719,481

3 Claims. (Cl. 148—6.3)

This invention relates to new and improved oxide coatings on capacitor electrodes, and more particularly to the formation of an oxide coating on certain foils useful as an anode in electrolytic capacitors.

Tantalum is a valve metal which may be formed into a foil and having oxide formed on its surface to result in a suitable anode for electrolytic capacitors. The oxide coating provides an insulating film on the tantalum foil which permits the foil to function as an anode of an electrolytic capacitor. Niobium similarly may have an oxide formed on the surface of a foil made of niobium to result in a suitable electrolytic capacitor anode. Titanium and zirconium metals are also useful in this type of construction.

A considerable problem is encountered in the forming of an oxide film of the desired thickness and physical strength on the tantalum foil. This arises from the fact that the volume occupied by the oxide of tantalum is greater than the volume occupied by the tantalum metal, as a consequence, the oxide tends to flack off the base on which it is deposited, or else the oxide is under such terrific compression that formation is inhibited and stops after a very thin layer of oxide has been built-up.

It is an object of this invention to provide a tantalum foil anode on which is formed a thick adherent oxide film.

It is another object of this invention to provide a thick adherent oxide film on foils of valve metals, such as niobium, titanium and zirconium.

Still another object of this invention is the production of an electrical component of tantalum utilizing a thick adherent oxide film as a dielectric or rectifying layer.

A still further object of this invention is the preparation of a tantalum metal to permit the creation of a thick adherent oxide film on the tantalum.

These and further objects of the invention, as well as the advantages of it, will be apparent from this specification as well as the appended claims.

According to the present invention, an oxide film having the desired properties of thickness and physical strength can be achieved by opening and expanding the crystalline lattice of foils of certain valve metals. The adsorption of hydrogen prior to the formation of an oxide film on the foil prepares the foil for the oxide film.

More specifically, the object of forming a thick adherent film on the tantalum foil is attained by first diffusing hydrogen into the crystalline lattice of tantalum and, second, forming an interstitial solid solution of hydrogen in a tantalum metal. By this process, the tantalum crystalline lattice is expanded thereby providing additional space on the tantalum metal. By this process, the tantalum crystalline lattice is expanded thereby providing additional space on the tantalum surface for the reception of the oxide film. This expansion of the lattice provides a surface which is volumetrically more nearly equal to the volume required by the oxide; thereby permitting greater adhesion between the metal surface and the oxide, and hence reducing compression to permit a thicker formation of oxide film. It is preferred to remove the occluded hydrogen by conventional vacuum degassing techniques prior to formation of the oxide film on the expanded tantalum. However, it also has been discovered that once the combination of the tantalum with hydrogen has been established, it is possible to obtain the desired film oxide by oxidation of the interstitial solid solution.

As an example of the invention and the mechanism by which it functions, reference is made to the formation of oxide films upon a tantalum surface which has previously been treated with hydrogen at an elevated temperature. Tantalum, when heated in hydrogen is known to assume a dense appearance, and to be converted to a hard and brittle solid tantalum hydride. In most cases, the hydride is not considered a true hydride as such, but is some type of loosely interstitial absorption product in which the hydrogen atoms are absorbed within the body-centered-cubic crystalline lattice of the tantalum, and cause an increase in the lattice constant of the metal. As evidence of the expanded condition of the tantalum lattice is the fact that the tantalum hydride has a density about 10% less than the density of tantalum; observed densities are 15.1 g./cc. for the hydride, and 16.6 g./cc. for the metal. In many cases, the ratio of tantalum to hydrogen for any given treated surface will vary depending upon the previous history of the metal, as well as the treatment conditions. The exact stoichiometric tantalum hydride is never believed to be formed. Indeed, if the absorption product can be termed to be a compound at all, it usually has the composition $TaH_{0.76}$ showing that there is a material deficiency in the hydrogen present. The same improved ratio is found even after the hydrogen has been removed be de-absorption from the metal structure as by heating under vacuum conditions. It has been found that removal of the hydrogen from the tantalum restores much of the lost ductility of the tantalum without causing the metal to contract to its original dimensions. In all cases, the basic body-centered-cubic crystalline lattice of the tantalum remains unchanged.

The result of the interstitial solid solution of hydrogen in the tantalum metal is the expansion of the crystalline lattice so that the tantalum oxide subsequently formed on the tantalum surface forms a bond as a result of the crystalline lattice. That is, the surface volumes occupied by the tantalum and the tantalum oxide are more nearly the same. This bond of the tantalum oxide is more adherent than previous tantalum oxides formed on tantalum foil, and the oxide may be more dense. The oxide film is also more resistant to higher voltages.

The simplest procedure in forming the interstitial surfaces used with the invention is by heating the metal in an atmosphere containing hydrogen gas at an elevated temperature, preferably within the range of from 500 to 2000° C. At such temperatures, the small atomic nuclei of the hydrogen employed diffuse quite readily within the surface of the atomically larger metallic constituent. Another method for forming these materials is reduction of various ionic compounds by agents such as sodium hypophosphate. Other equivalent methods can also be used.

It is preferred that the occluded hydrogen be outgassed from the tantalum by conventional vacuum degassing techniques, employing temperatures slightly below the hydriding temperature and relatively low vacuum, e.g., temperatures between 200° and 400° C. and vacuums of about 1 micron. The precise type of oxidation employed so as to form oxide coatings on the interstitial surfaces of the invention is substantially immaterial. Any of the conventional capacitor anode formation techniques produce thicker and more adherent oxide films when employed with tantalum that has been treated in accordance with the teachings of this invention. These outer layers can be converted to the oxide by anodic or other suitable treatment, such as, for example, heating in an oxygen containing atmosphere. Frequently, it is advantageous to first form a hydride during electrolytic deposition of the metal upon the cathode of an electrolytic system, and then to reverse the polarity of the system so as to oxidize the tantalum. The hydrogen is effectively removed from the tantalum hydride by reaction with oxygen to form water in the electrolyte.

The oxide layers formed as in the preceding paragraph are extremely advantageous electrical insulators by virtue of their thickness and uniformity. Frequently, the etch ratio of a formed electrode can be improved to a material extent by the treatment discussed. Also higher scintillation voltages are obtained by this procedure. Many of the oxide films obtained show quite advantageous rectifying properties.

Many specific modifications may be made within the broad scope of this disclosure. As an example, layers of metal produced upon a hot ceramic by gas-phase deposition can be converted to interstitial layers by gas treatment in a fluidized bed. Similarly, porous pellets of metal may be heated in a hydrogen atmosphere so as to fuse the adjacent edges of the particles together, and at the same time, to produce an interstitial alloy. Porous pellets can also be converted to the interstitial forms discussed once they are formed.

For the purpose of illustration only, and not to limit the scope of the invention, the following specific example is given:

A tantalum sheet approximately 5 mils thick, 4 inches long, and one inch wide was heated in hydrogen at a temperature of 1500° C. for a period of 20 minutes. The resulting embrittled tantalum sheet was then degassed in a vacuum of 1 micron at 350° C. for a period of about four hours. At the end of this time, an adherent oxide film was formed upon the surface of the metal by anodic oxidation to 600 volts in an aqueous bath saturated with boric acid using an initial current density of 40 amps. p.s.c.

The above disclosed process provides the means for preparing the units of the surface of the tantalum structure for the tantalum oxide which is finally formed on the tantalum surface. The tantalum oxide requires more space than is present on the tantalum surface. For the purpose of this description, this may be analogized in the term "crowding." By forming the interstitial hydride, the tantalum surface is provided with a means for permanently expanding the tantalum lattice so that the tantalum oxide finds adequate accommodations on the metal surface.

As indicated above the oxide film produced on the surface of tantalum foil by this invention has advantages which are attributable to the interstitial solid solution of the hydrogen in the crystalline lattice. This permits the tantalum oxide subsequently formed on the tantalum surface to find in the crystalline lattice a better structure with which to form a more adequate bond. As a result of this better bond the tantalum oxide is more adherent and may be made more dense. Some of the advantages from this oxide are indicated above. By providing the interstitial alloy the tantalum surface has been prepared for accommodation of the oxide which is subsequently formed on the surface.

This invention is particularly applicable to tantalum foil and the preparation of anodes for electrolytic capacitors for tantalum foil. The application of this invention, however, is of value in other valve metals. Niobium is particularly receptive to this method of forming an oxide on its surface. Niobium may be prepared for use as an electrolytic anode within the concept of this invention by heating a foil of niobium in a hydrogen atmosphere at temperatures of the same order as the temperatures set forth above in connection with the tantalum treatment by permitting the niobium to cool in the hydrogen atmosphere. The hydride obtained has a composition of $NbH_{0/86}$ and has expanded the lattice of the niobium to the point where it does not return to the original lattice condition upon removal or replacement of the hydrogen. The alloys of tantalum and niobium may also be employed according to the teachings of this invention; the hydrides obtained have compositions between the compositions of tantalum hydride and niobium hydride, depending on the proportions of the metals in the alloy.

An interstitial alloy of hydrogen in titanium and zirconium foils proves to be advantageous in the production of thicker and more adherent oxide films on the surface of these metals and enhances their use as electrolytic capacitor anodes. It has been found that hydrides of titanium and zirconium are about 15% less dense than the metals themselves. The interstitial alloy of the hydrogen with the valve metal is formed prior to oxide formation. Then subsequently the hydrogen is removed and the surface is oxidized to form on the surface of the foil the oxide which makes the metal useful as an electrolytic capacitor anode.

This invention constitutes the expansion of the crystalline lattice of tantalum foil with interstitial hydrogen to prepare the foil for the oxide which makes it a good anode. Niobium foil in particular but also titanium and zirconium foils have their oxide forming properties enhanced by interstitial hydrogen in the surface of the foil.

The instant application is a continuation-in-part of application Serial Number 353,681, filed May 7, 1953, now abandoned.

It will be understood that the above-described embodiments are set forth for the purpose of illustration and that the invention is limited only by the scope of the appended claims.

What is claimed is:

1. An electrolytic capacitor anode comprising a foil of a metal selected from the group consisting of tantalum and niobium, said foil having a dielectric surface composed of an insulating film of thick oxide, the crystalline lattice at the surface of said foil having an expanded lattice constant, an intermixture of oxygen in solid solution being formed within the interstices of said expanded crystalline lattice by heating said foil in hydrogen gas at a temperature ranging from 500° C. to 2000° C., diffusing nuclei of hydrogen gas within the interstices of said crystalline lattice to form a solid solution of hydrogen therein and to expand said lattice, suitably removing the hydrogen at an elevated temperature from within said interstices and introducing the oxygen to form said solid solution of oxygen embedded within said interstices of said expanded crystalline lattice.

2. An electrolytic capacitor anode as claimed in claim 1 comprised of tantalum.

3. An electrolytic capacitor anode as claimed in claim 1 comprised of niobium.

References Cited in the file of this patent

UNITED STATES PATENTS

| | | |
|---|---|---|
| 2,538,053 | Smith | Jan. 16, 1951 |
| 2,575,724 | McIntosh | Nov. 20, 1951 |
| 2,591,460 | Morrill | Apr. 1, 1952 |

FOREIGN PATENTS

| | | |
|---|---|---|
| 19,998/34 | Australia | Nov. 2, 1934 |
| 760,199 | Great Britain | Oct. 31, 1956 |